Figure 1:
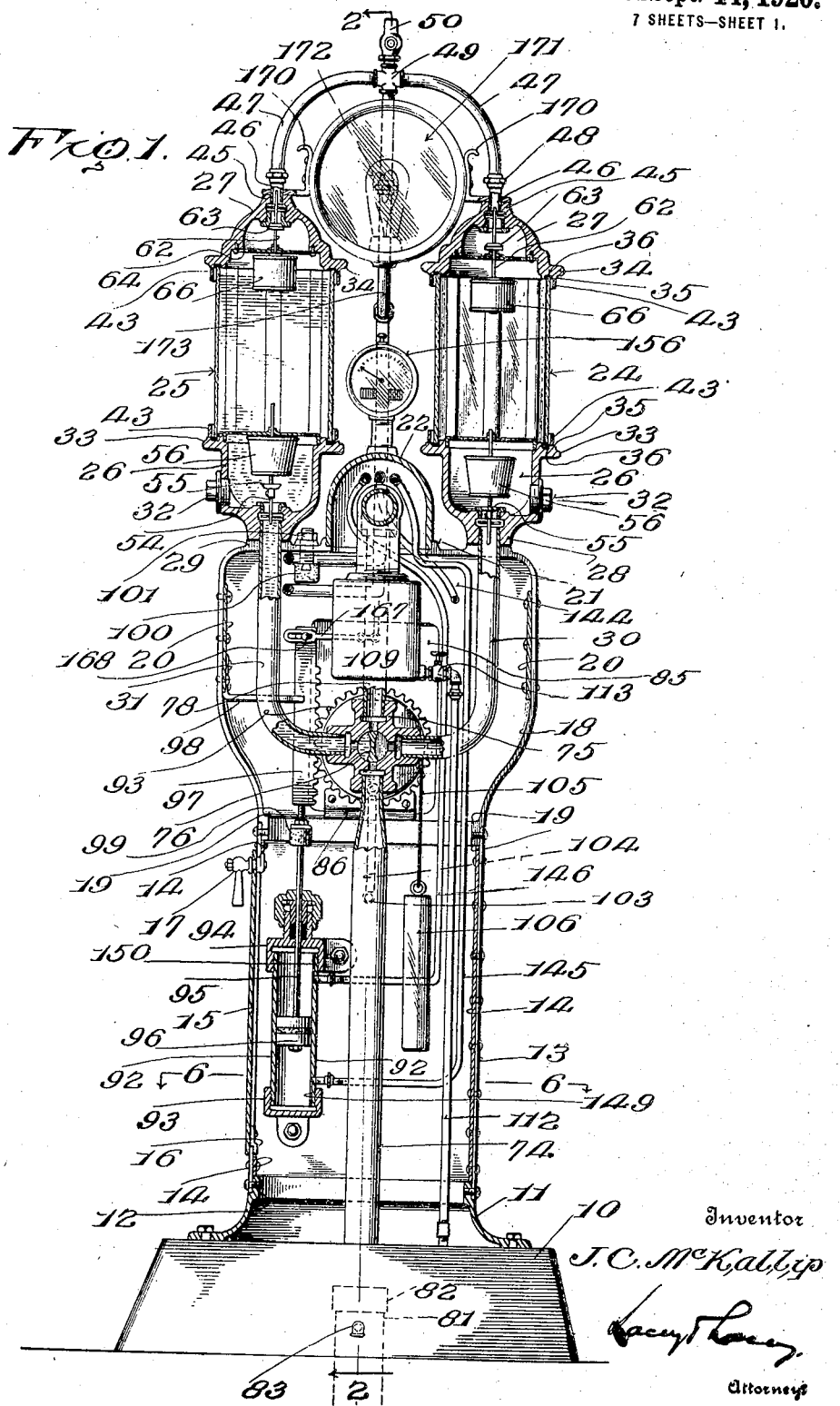

J. C. McKALLIP.
GASOLENE MEASURING DEVICE.
APPLICATION FILED APR. 16, 1918.

1,352,820.

Patented Sept. 14, 1920.
7 SHEETS—SHEET 1.

Inventor
J. C. McKallip

Attorneys

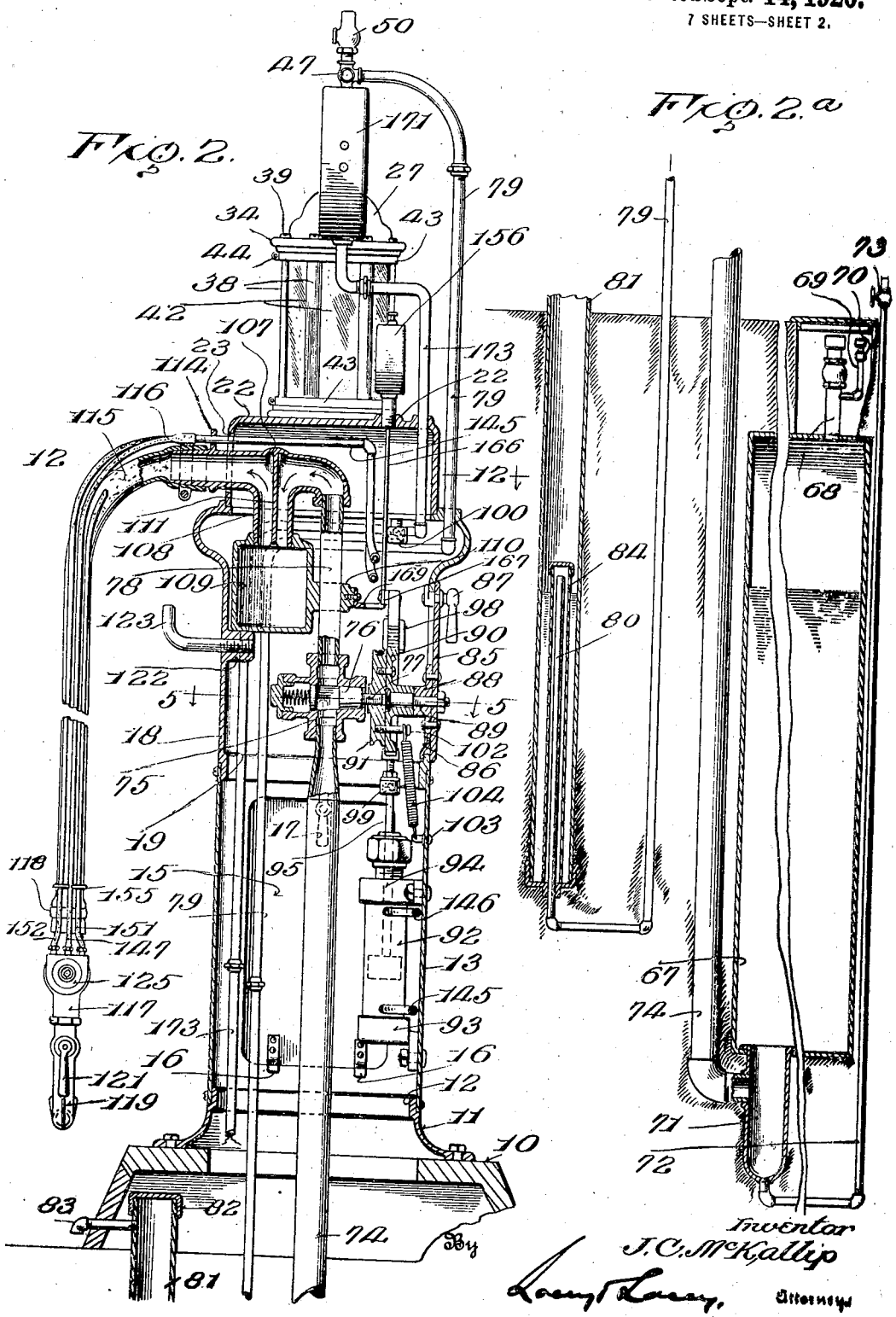

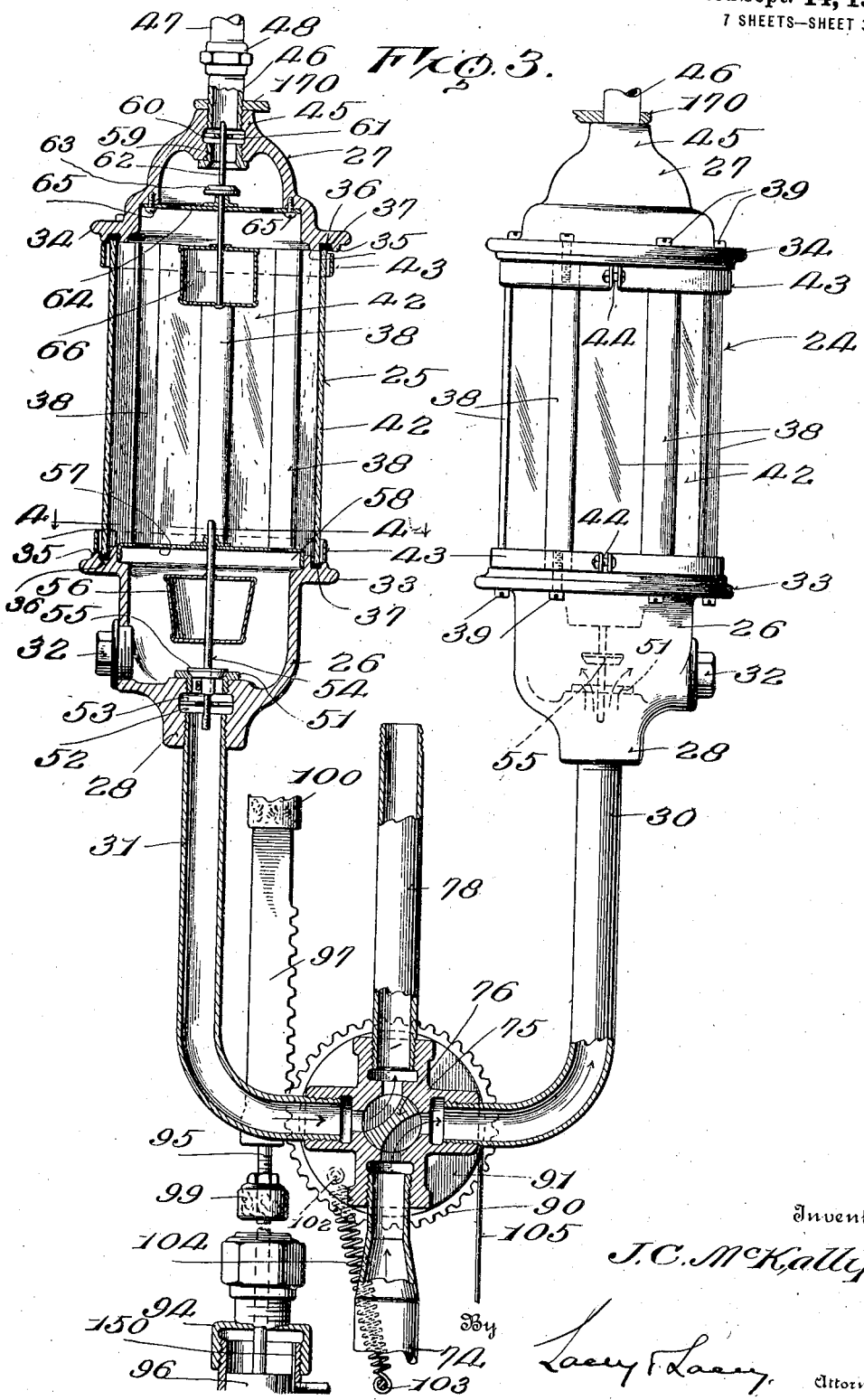

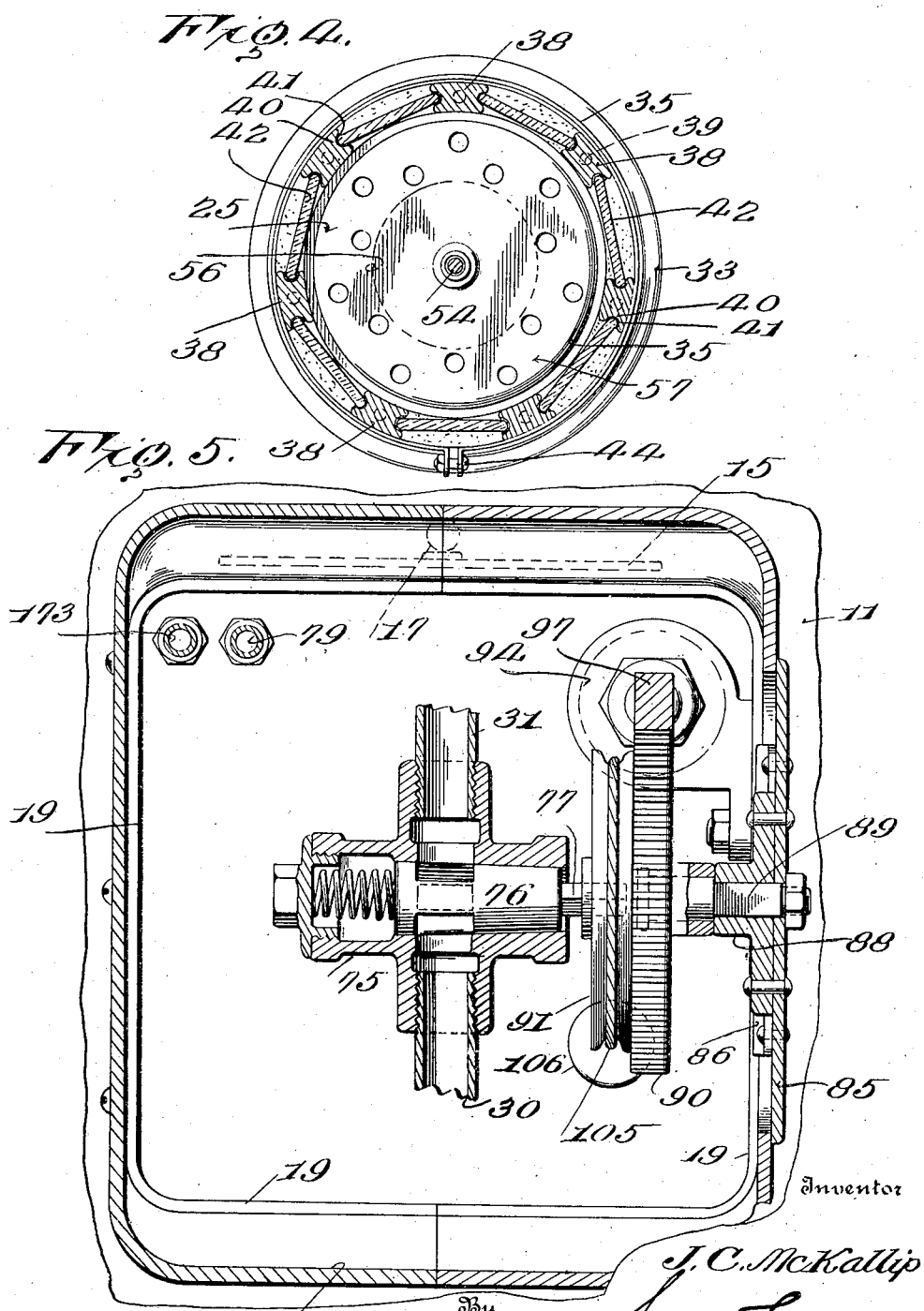

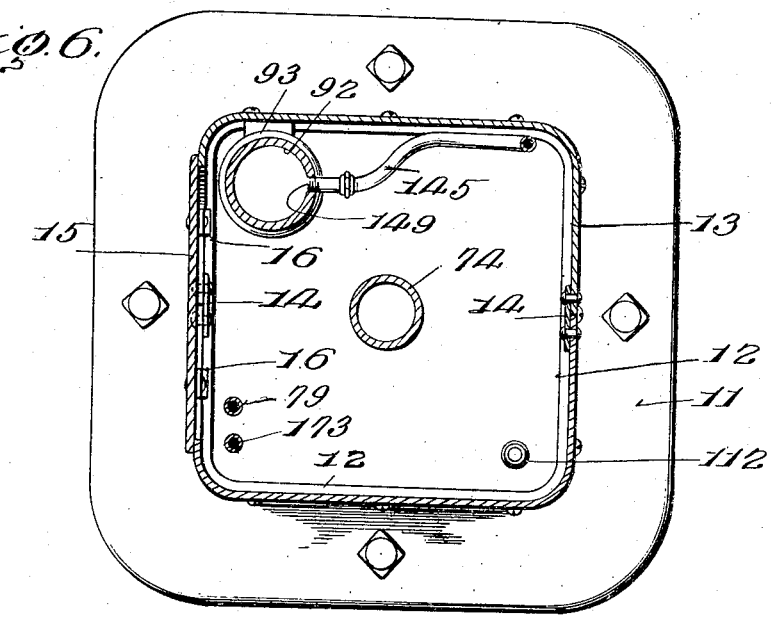
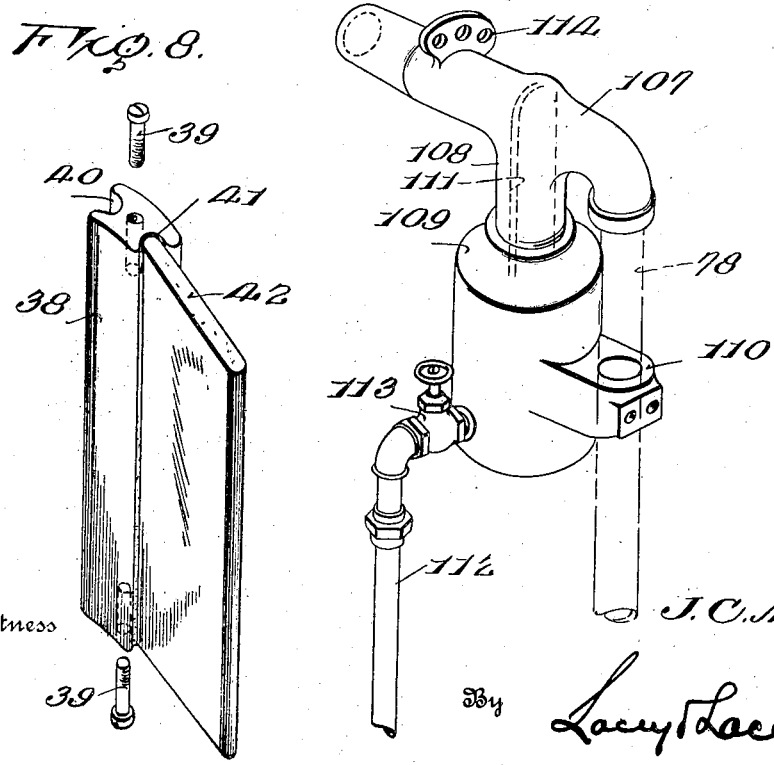

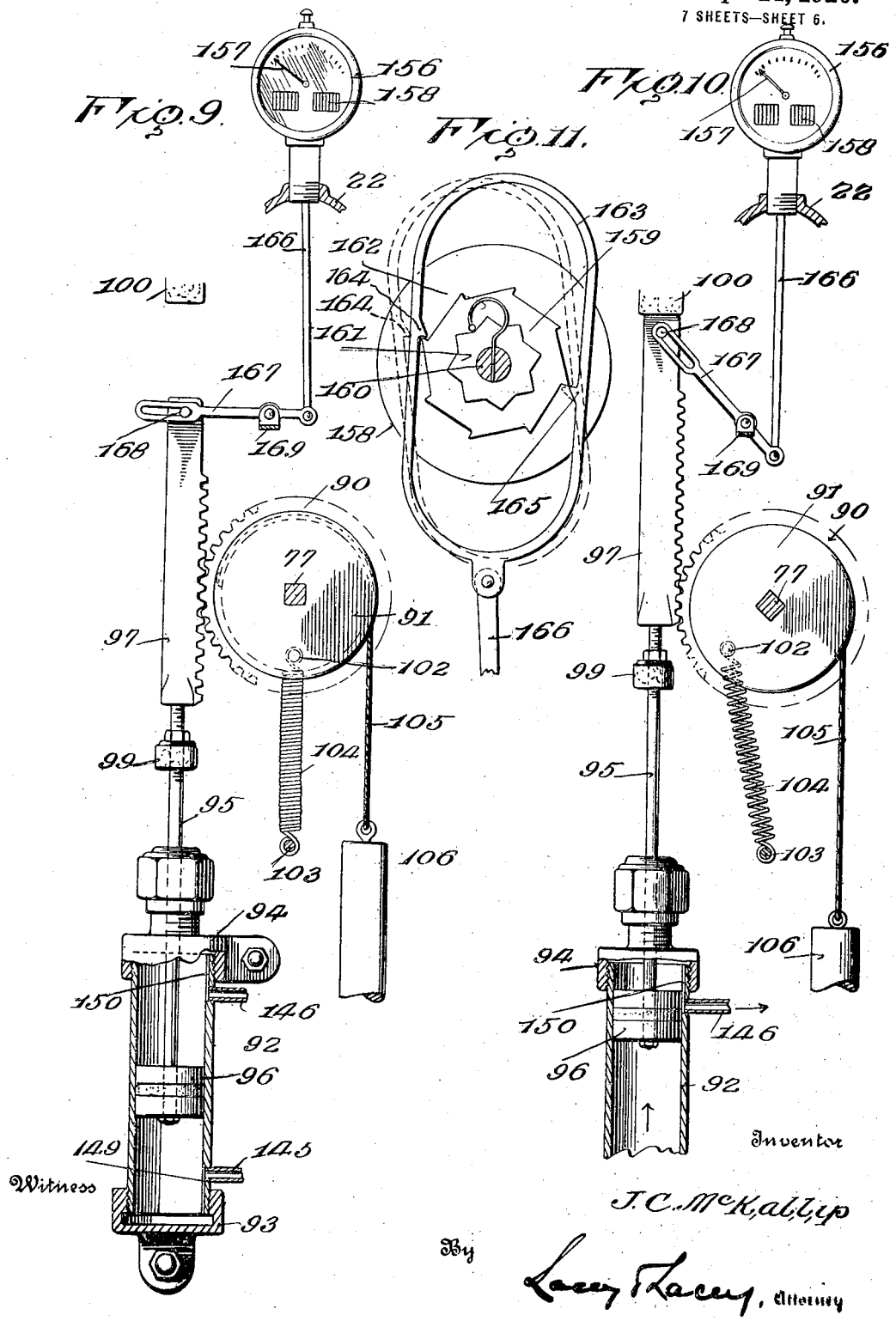

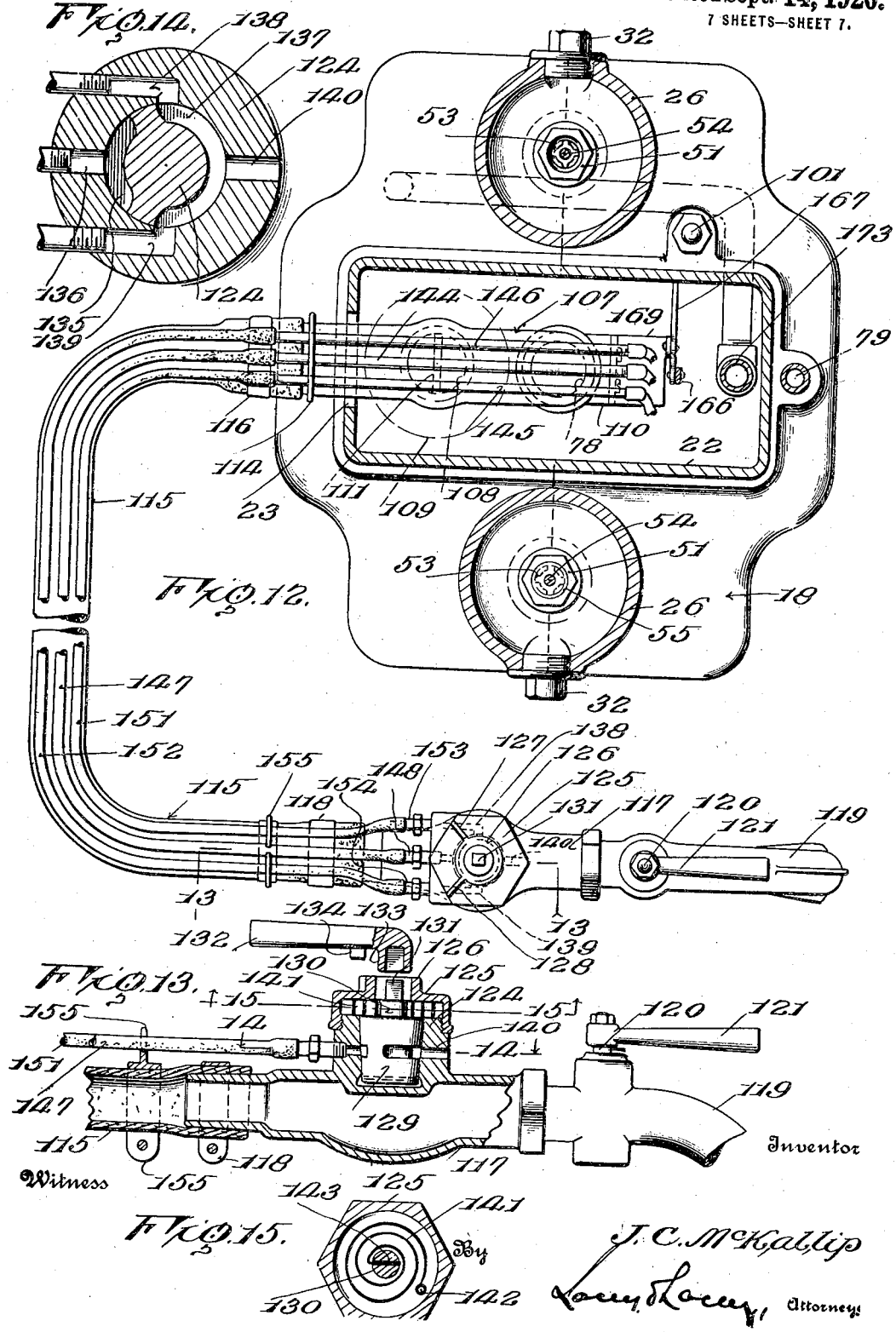

UNITED STATES PATENT OFFICE.

JOHN C. McKALLIP, OF HOUSTON, TEXAS.

GASOLENE-MEASURING DEVICE.

1,352,820.

Specification of Letters Patent.   Patented Sept. 14, 1920.

Application filed April 16, 1918.   Serial No. 228,889.

*To all whom it may concern:*

Be it known that I, JOHN C. McKALLIP, a citizen of the United States, residing at Houston, in the county of Harris and State of Texas, have invented certain new and useful Improvements in Gasolene-Measuring Devices, of which the following is a specification.

This invention relates to an improved gasolene measuring device and has as one of its objects to provide a construction wherein, if desired, a constant flow of measured gasolene may be had.

The invention has as a further object to provide a measuring device employing complemental measuring vessels connected with a storage tank maintained under air pressure for delivering the gasolene to the measuring vessels and wherein a four-way valve will be employed for selectively controlling the simultaneous filling of one vessel and the emptying of the other.

A further object of the invention is to provide a construction wherein the four-way valve employed will be operated by compressed air and wherein the movement of the valve in opposite directions for emptying either of the measuring vessels and filling the other will be under the selective control of a suitable operating valve carried by the discharge hose of the device so that the said operating valve will be easily accessible.

A further object of the invention is to provide a construction wherein the measuring vessels will be connected with each other in such manner that air displaced from one measuring vessel, as such vessel is filled, will be directed into the other measuring vessel to accelerate the emptying of the latter vessel and wherein a pressure regulator will be connected with the measuring vessels for taking care of any excess pressure created in the vessel being emptied by variance between the rate of filling of one vessel and the rate of discharge of the other.

And a still further object of the invention is to provide an arrangement wherein an indicator will be employed for registering the quantity of gasolene discharged and wherein the said indicator will be automatically actuated each time one of the vessels is filled and the other is emptied.

Other and incidental objects will appear as the description proceeds. In the drawings wherein I have illustrated the preferred embodiment of the invention, and wherein similar reference characters designate corresponding parts throughout the several views:

Figure 1 is a vertical sectional view of my improved measuring device showing the four-way valve and associated parts of the device in normal position, Fig. 2 is a sectional view taken at right angles to Fig. 1 and more particularly illustrating the mounting of the actuating gear for the four-way valve. Fig. 2ª is a fragmentary sectional view showing the storage tank and pressure regulator of the device, Fig. 3 is a fragmentary sectional view illustrating the measuring vessels and four-way valve of the device on an enlarged scale, Fig. 4 is a transverse sectional view taken on the line 4—4 of Fig. 3 and more particularly showing the construction of the walls of the measuring vessels, Fig. 5 is a transverse sectional view taken on the line 5—5 of Fig. 2 and looking in the direction of the arrows, this view particularly showing the counterbalance for the actuating gear of the four-way valve, Fig. 6 is a transverse sectional view taken on the line 6—6 of Fig. 1, and particularly showing the construction of the body of the stand of the device, Fig. 7 is a fragmentary perspective view of the sediment trap employed, Fig. 8 is a detail perspective view showing one of the slats and a coacting pane of the walls of the measuring vessels, Fig. 9 is a fragmentary elevation shown partly in section and illustrating on an enlarged scale the air cylinder, piston, and associated parts, for actuating the four-way valve and the indicator of the device, Fig. 10 is a view similar to Fig. 9 showing the piston moved to actuate the four-way valve, Fig. 11 is a fragmentary vertical section showing the ratchet mechanism of the indicator, Fig. 12 is a transverse sectional view taken on the line 12—12 of Fig. 2, and particularly showing the arrangement of the discharge hose of the device and the pipes leading to the operating valve carried by the said hose, Fig. 13 is a fragmentary vertical sectional view more particularly illustrating the mounting of the operating valve, Fig. 14 is a fragmentary sectional view taken on the line 14—14 of Fig. 13 and looking in the direction of the arrows, this view particularly showing the construction of the operating valve, and Fig. 15 is a fragmentary sectional view taken on the line 15—15 of Fig. 13 and looking in the direction of the arrows, this view particularly showing the mounting of the spring employed for normally holding the plug of the operating valve in centered closed position.

In carrying out the invention my improved measuring device is formed with a hollow stand including a base 10 from which rises the body of the stand. This stand body includes a bottom casting 11 bolted or otherwise secured to the base and provided at its upper end with a flange 12. Surrounding this flange to rest upon the bottom casting is a body shell 13, bolted or otherwise secured to the said flange. This shell is preferably formed of suitable sheet metal and is constructed of mating sections joined by tie plates 14. Formed in one side wall of the shell is a door opening and normally closing this opening is a door 15 provided at its lower margin with spaced lugs 16 secured to the inner side face of the door to engage within the shell, while, at its upper end, the door is equipped with a catch 17 normally coacting with the shell for holding the door in place. As will be seen, this door may be readily removed when desired. Mounted upon the body shell 13 is a top casting 18 provided at its lower end with a flange 19 fitting within the upper end of the shell and secured thereto by screws or other suitable fastening devices. The top casting 18 is enlarged toward its upper extremity and is preferably formed of sections connected by tie plates 20 overlying the inner side faces of the sections at the joint therebetween. Formed through the top wall of the casting medially thereof is an elongated opening and surrounding this opening is an upstanding flange 21. Fitting within this flange to open into the said casting is a hollow dome or cap 22 provided in its forward end, as particularly shown in Fig. 2, with an opening 23.

Mounted upon the top casting 18 of the stand at opposite sides of the dome 22 are complemental measuring vessels which as a whole have been indicated at 24 and 25 respectively. These measuring vessels include substantially frusto-conical base heads 26 and similarly shaped cap heads 27 confronting the base heads. The base heads, at their lower ends, are formed with bosses 28 resting upon suitable raised seats 29 upstanding from the top wall of the top casting 18 of the stand and secured to the said casting by inlet pipes 30 and 31 respectively, fitted at their upper extremities through the said wall and threaded into the said bosses. These base heads are, upon the outer sides thereof, equipped with drain plugs 32 and formed on the upper ends of the said heads are radial annular lips 33. The cap heads 27 are, at their lower ends, provided with similar lips 34. Formed on these lips are, concentric inner and outer flanges 35 defining intermediate annular channels 36 upon the confronting faces of the lips. Disposed within these channels are suitable gaskets 37 and fitting within the said channels to engage the gaskets is a plurality of circumferentially spaced slats 38, one of which is shown in detail in Fig. 8 of the drawings. These slats thus serve to support the top and bottom heads of the vessels spaced apart and are connected with the said heads by a plurality of screws or other suitable fastening devices 39 loosely fitted through the lips 34 of the heads and threaded axially into the ends of the slats. The slats 38 are formed in the side edges thereof with vertical grooves 40 in which are fitted suitable gaskets 41 and snugly engaging within the grooves of adjacent slats to bear against said gaskets are transparent glass panes or panels 42. These panels thus coöperate with the slats to form the cylindrical walls of the measuring vessels and surrounding the said walls adjacent the top and bottom edges thereof to engage the slats 38 are straps 43 which are connected at their ends by bolts 44 adjustable to contract the said straps and consequently clamp the panels 42 between the slats 38. Tight joints will thus be maintained between the slats and the said panels while the screws 39 may be adjusted to clamp the lips 34 of the top and base heads against the ends of these members and maintain tight joints therebetween. Furthermore, this construction provides an arrangement allowing for the expansion and contraction of the panels and slats and their consequent tendency to shift radially while, at the same time, the straps 43 will maintain a constant tension upon the said slats and panels to always insure tight joints therebetween. The measuring vessels may be of any suitable capacity as, for instance, a maximum of five gallons each, and it will be noted that by forming the cylindrical walls of the said vessels with the transparent panels 42, a purchaser of gasolene may readily observe as to whether or not the said vessels are properly filled.

At their upper ends the cap heads 27 of the measuring vessels are formed with axial bosses 45 and threaded into the outer extremities of these bosses are nipples 46. Communicating at its ends with these nipples is an upwardly bowed pipe 47, connected with the said nipples by unions 48 and interposed in the length of said pipe at a point substantially midway of its ends is a four-way connection 49. Upstanding from this connection is a suitable pressure operated safety valve 50. Threaded into the inner ends of the bosses 28 of the bottom heads 26 of the measuring vessels are valve seats 51 terminating in spaced relation to the adjacent ends of the inlet pipes 30 and 31 to provide chambers 52 and mounted in these chambers are skeleton valve stem guides 53. These valve stem guides are each in the nature of a spider formed of suitable resilient material so that the arms thereof may be flexed for inserting the guides into the said chambers when the said arms may then again be straightened to coact with the walls of the chambers for centering the guides with respect thereto and yieldably holding the guides fixed within the chambers. Loosely fitted at their lower ends through the valve stem guides 53 are valve stems 54 upon which are adjustably fitted valves 55 to coöperate with the valve seats 51. Fixed upon the said valve stems within the bottom heads 26 are hollow metal floats 56 and slidably receiving the said stems at their upper ends are perforated guide plates 57 provided with marginal lateral flanges 58 snugly fitting within the innermost of the flanges 35 upon the bottom heads to rest upon and thus close said heads at their upper ends. In this connection it will be observed upon reference to Fig. 3 of the drawings, that the innermost of the flanges 35 upon the bottom heads 26 are somewhat elongated to coact with the flanges 58 of the said plates. As will be clear, these plates will coact with the guides 53 for slidably supporting the valve stems 54 and the valves 55 for movement axially of the valve seats 51. Threaded into the inner extremities of the bosses 45 of the cap heads 27 are valve seats 59 terminating in spaced relation to the adjacent ends of the nipples 46 to define chambers 60 and mounted within these chambers are valve stem guides 61 which are similar to the guides 53 and are placed in position in like manner to be yieldably held fixed within the chambers. Slidably mounted at their upper ends through these guides are valve stems 62 upon which are fixed valves 63 to coöperate with the valve seats 59. Slidably receiving the valve stems below these valves are perforated guide plates 64 closing the cap heads 27 and seating against suitable annular shoulders formed therein to be secured in position by a plurality of screws or other suitable fastening devices 65. These plates will thus coact with the guides 60 to support the valve stems 62 and valves 63 for movement axially with respect to the valve seats 59 and fixed to the lower ends of the valve stems are hollow metal floats 66. As will now be readily understood, the valves 55 will normally gravitate to closed position while the valves 63 will normally gravitate to open position, and in this connection it is to be noted that the passage provided through the valve seats 59 and pipe 47 is somewhat smaller than the passage of each of the inlet pipes 30 and 31.

Preferably located underground adjacent the stand of the device is a storage tank 67 which, as shown in Fig. 2ª of the drawings, may be similar to the storage tank disclosed in my pending application for gasolene measuring device, filed March 20, 1917, Serial Number 156,127. This storage tank is provided with a filler pipe 68 having an air supply pipe 69 communicating therewith. Any approved source of air supply may be connected with this pipe in which is arranged a conventional check valve 70 for maintaining a suitable constant air pressure within the storage tank. Projecting below the bottom of the tank is a sump 71 from the bottom of which leads a drain pipe 72 having an approved shut off valve 73 interposed therein and connected with the sump adjacent its upper end is a supply pipe 74 which, as particularly shown in Figs. 1 and 2 of the drawings, extends up into the stand of the device. Mounted upon the upper end of this supply pipe is a four-way valve 75 having a rotatable valve plug 76 provided at its outer extremity with a squared terminal 77. As particularly shown in Figs. 1 and 3 of the drawings, the inlet pipes 30 and 31 are extended downwardly within the body of the stand at opposite sides of the valve 75 and are provided with laterally directed terminals threaded into the side ports of the valve casing, and leading from the uppermost port of the said casing opposite the supply pipe 74 is a discharge pipe 78. Communicating at its upper end with the four-way connection 49 of the pipe 47 is a pipe 79 which enters through the top casting 18 of the body of the stand at a point in the rear of the dome 22, and thence extends to one side wall of the said casting, when the said pipe is carried forwardly within the casting and is then directed downwardly through the body of the stand. From the stand this pipe is then continued underground and, as shown in Fig. 2ª of the drawings, terminates in an upwardly directed stand pipe 80 extending axially through the bottom end of a vertically disposed pressure regulator casing 81 sunk into the ground at a point adjacent to the stand. At its upper end the casing 81 projects above the ground level and is closed by a removable cap 82 while a vent pipe 83 projects from the casing to communicate with the outer air. Slidably fitted over the stand pipe 80 is a pressure regulating sleeve 84 sealed with respect to the casing by a suitable liquid contained in the bottom portion thereof.

As will now be seen in view of the preceding description, the valve plug 76 will, when in normal closed position as shown in Fig. 1, shut off communication between the supply pipe 74 and the inlet pipes 30 and 31 respectively, as well as the discharge pipe 78. However, by rotating this lug in one direction, communication may be established between the supply pipe and the inlet pipe 30, while, at the same time, communication will also be established between the pipe 31 and the discharge pipe 78. Thus, gasolene from the storage tank will, owing to the air pressure within the said tank, be forced up into the measuring vessel 24 for filling the said vessel while the measuring vessel 25 will simultaneously be allowed to empty. In the practical use of the device one of the measuring vessels will always stand full and I have accordingly, in Fig. 1, shown the measuring vessel 25 filled. When the valve plug 76 is rotated in the opposite direction, communication will be established between the supply pipe and the inlet pipe 31 while, at the same time, communication will also be established between the pipe 30 and the discharge pipe 78. Thus, in this latter instance, the measuring vessel 25 will be filled from the storage tank while the measuring vessel 24 will be simultaneously permitted to empty. It is now to be observed that since the measuring vessel 24 is empty, the valve 55 of this vessel is closed, while the valve 63 thereof is open. On the other hand, the measuring vessel 25 being filled, the valve 55 of this vessel is held open by its float 56 while the valve 63 of such vessel is held closed by its float 66. Under these conditions the valve 55 of the vessel 24 will, when the valve plug 76 is rotated for filling the vessel 24 and discharging the vessel 25, be lifted from its seat so that the gasolene from the storage tank may flow into the vessel 24. As the level of the gasolene rises in this vessel the air therein will be discharged through the pipe 47 into the vessel 25 which, as previously explained, will be emptied simultaneously with the filling of the vessel 24. Thus, inrushing gasolene flowing into the vessel 24, will create a pressure of air within the vessel 25 tending to accelerate the discharge of gasolene from this latter vessel. Upon the filling of the vessel 24, the valve 63 thereof will be lifted to closed position by its float 66 to prevent overflow of this vessel through the pipe 47 into the vessel 25 while upon the emptying of the vessel 25 the valve 55 thereof will be lowered to closed position by its float 56 to prevent escape of the air pressure in this latter vessel through the pipe 31 to the discharge pipe. Upon the emptying of the vessel 24 and the filling of the vessel 25, the action of these several valves will, of course, be the reverse of that just previously described. It will accordingly be seen that these valves will prevent the overflow of one vessel to the other and will also prevent the escape from either of the vessels, of the air pressure therein created by the filling of the other vessel. However, it has been found in practice that the filling of either of the vessels will occur faster than the discharge of the other vessel. This, of course, tends to create an unequal air pressure in the vessels as well as an undue air pressure in the vessel being filled. I accordingly provide the pressure regulator for taking care of such excess air pressure as well as maintaining a constant uniform pressure in both of the vessels during the filling and discharging operation thereof. As will be seen, pressure of air in the pipe 47 will be communicated through the pipe 79 into the sleeve 84 of the regulator. Consequently, any excess pressure occurring in either of the measuring vessels will be permitted to expand within and lift this sleeve accordingly while, at the same time, the sleeve will gravitate within the casing 81 of the regulator for maintaining a constant and uniform pressure in both of the measuring vessels. To positively guard against the possibility of extreme pressure in the measuring vessels, the safety valve 50 is provided.

Formed through the rear side of the top casting 18 of the stand is a door opening normally closed by a door 85 provided at its lower margin with a transverse flange 86 engaging within the casting at the lower edge of the door opening. At its upper end the door is equipped with a catch 87 engaging within the casting at the upper edge of the door opening for removably supporting the door in position. Riveted or otherwise secured to the inner side face of this door is a plate 88 through which is fitted the squared outer end of a headed stub shaft 89 projecting laterally from the door into the body of the stand axially of the valve plug 76 and connected with the door by a suitable nut threaded upon the outer end of the said shaft. Rotatable upon the inner end of the shaft and held thereon by its head is a gear wheel 90 to the outer side face of which is secured by a plurality of screws or other suitable fastening devices, a pulley 91 formed axially with a suitable squared socket removably receiving the squared terminal 77 of the valve plug 76. This pulley, therefore, provides an operative connection between the valve plug and the gear wheel 90. Mounted within the shell 13 of the stand below this gear wheel is an air cylinder 92 provided at its lower end with a head 93 and at its upper end with a head 94. These heads are formed with lateral attaching lugs through which are fitted bolts or other suitable fastening devices securing the cylinder to the wall of the shell. Carried by the upper head 94 is a suitable packing gland through which is fitted the rod 95 of a piston 96 mounted to reciprocate within the said cylinder. Connected to the piston rod at its upper end is a rack bar 97 arranged to coöperate with the gear wheel 90 and mounted upon the wall of the top casting 18 to project inwardly therefrom is an arm 98 engaging at its free extremity with the rack bar for guiding the said bar in its vertical movement. A yieldable bumper 99 is mounted upon the upper end of the piston rod for limiting the piston at the end of its downward stroke while a similar bumper 100 is supported to engage the upper end of the rack bar for limiting the piston at the end of its upward stroke. This latter bumper is, as particularly shown in Fig. 1, suitably fixed to the inner end of a bolt 101 threaded through the top wall of the casting 18 of the stand body to project therein above the said rack bar. Thus it will be seen that upward movement of the piston 96 within the cylinder 92 will rotate the valve plug 76 in one direction for filling the measuring vessel 24 and simultaneously emptying the measuring vessel 25, as previously described, while downward movement of the piston will rotate the valve plug in the opposite direction for filling the measuring vessel 25 and emptying the measuring vessel 24. Projecting from the inner side of the gear wheel 90 at a point adjacent its periphery is a pin 102 and projecting inwardly from the wall of the shell 13 of the stand body below the said gear wheel and in a vertical plane with the axis thereof, is a second pin 103. Extending between these pins is a helical centering spring 104 for the said gear. Upon rotation of the gear in either direction, this spring will act to yieldably return the gear to centered position for accordingly centering the valve plug 76 and piston 91 which will thus also be yieldably held centered by the said spring. Secured to the pulley 91 at a point upon the periphery thereof is a cable 105 and suspended from this cable within the stand body is a weight 106 counterbalancing the weight of the rack bar 97, piston rod 95 and piston 96 upon the gear 90. Consequently, this gear will always readily respond to the action of the spring 101. It will, therefore, be clear that the valve plug 76 will always be yieldably returned to and held, as shown in Fig. 1 of the drawings, in normal closed position with the piston 96 centered with respect to the air cylinder 92. In this connection attention is directed to the fact that the spring 101 is detachably connected with the pins 99 and 100. Consequently, by releasing the catch 87, the actuating gear 90 and associated parts may be removed with the door 85 from the stand body. Thus, access may be easily had to these parts as well as to the four-way valve 75. Obviously, this construction provides a very desirable arrangement looking to the maintenance of the efficient operation of the device in practical use.

Secured to the upper end of the discharge pipe 78 is a trap connection 107 projecting at its outer extremity though the opening 23 in the forward end of the dome 22. This trap connection is provided upon the lower side thereof with a nipple 108 upon which is threaded a trap 109. The trap is thus supported within the body of the stand and upon its inner side is provided with a sleeve 110 receiving the discharge pipe 78. Dividing the trap connection is a partition 111 which, as particularly shown in Fig. 2, extends medially of the nipple 108. A passage is thus defined from the discharge pipe 78 through the inner end of the trap connection and nipple 108 into the trap 109 and from the trap through the nipple 108 and outer end of the trap connection. All of the gasolene flowing through the discharge pipe will thus be directed through the trap for freeing the gasolene of any foreign substance and leading from the bottom of the trap is a drain pipe 112 which is carried down through the body of the stand to a suitable point of discharge. Normally closing the said drain pipe is a shut off valve 113 which is located adjacent the trap so that by removing the door 85 as previously described, this valve may be easily reached for draining the trap. Upstanding from the trap connection adjacent its outer end is an apertured guide 114 and fitted at its inner end over the adjacent end of the said connection is a discharge hose 115 secured to the said connection by a clamp 116. Fitted in the outer end of the discharge hose is a pipe section 117 connected with the said hose by a clamp 118 and threaded into the outer end of the said pipe section is a discharge nozzle 119 equipped with a suitable shut off valve 120 operable by a hand lever 121. Thus, the discharge hose may be led to the tank of a motor vehicle and the discharge nozzle inserted through the filling opening of the tank when, upon the opening of the valve 120, the gasolene will be discharged directly into such tank. Formed on the top casting 18 of the stand at its forward side is an inwardly projecting boss 122 into which is screw threaded a hook 123 for normally supporting the free end of the discharge hose.

As particularly shown in Figs. 12 to 15 of the drawings, the pipe section 117 of the discharge hose is formed upon its upper side with a cylindrical valve casing 124 closed at its upper end by a cap 125 threaded onto the casing. This cap is provided axially of the casing with a suitable opening surrounded by an upstanding annular flange 126 and projecting from this flange radially of the cap are spaced stop flanges 127 and 128 respectively. Rotatably mounted within the valve casing is a valve plug 129 provided at its upper end with a stem 130 having a squared reduced terminal 131 projecting axially through the opening in the cap 125 within the flange 126 thereof. A handle 132 is provided for the valve plug and this handle, at its inner end is formed with a squared socket 133 adapted to removably fit over the terminal 131 of the valve stem within the flange 126 when the handle may be swung for rotating the valve plug. Depending from the valve handle in the rear of the socket 133 is a stop lug 134 adapted for selective engagement with the stop flanges 127 and 128 of the valve cap for limiting the valve plug in its rotary movement in opposite directions. As shown in detail in Fig. 14 of the drawings, the valve plug is provided with a circumferential passage 135 and formed through the valve casing to be in constant communication with this passage is an air supply passage 136. Opposite the passage 135 the valve plug is formed with a second circumferential passage 137 and formed through opposite sides of the valve casing to normally communicate with this passage are passages 138 and 139 respectively. Diametrically opposite the air supply passage 136, the valve casing is formed with a vent passage 140 constantly in communication with the passage 137 of the valve plug. Housed between the cap and the upper end of the valve casing is an axial centering spring 141 secured at one end, as shown in detail in Fig. 15, to a pin 142 upstanding from the valve casing and at its opposite end fitted through a suitable slot 143 opening through the upper end of the valve stem 130. This spring is adapted to yieldably return the valve plug to centered position, as shown in Fig. 14, and normally hold the said plug in such position. When the plug is thus centered, it will be noted that flow from the passage 136 is cut off through the valve while communication is established through the valve between the passages 138 and 139 and the vent passage 140. Leading upwardly through the body of the stand is an air supply pipe 144. This pipe may be connected with any suitable source of air supply, not shown, for delivering a suitable constant air pressure and, at its upper extremity, is carried forwardly through the dome 22 medially of the trap connection 107 to be fitted at its outer end through the guide 114 carried by the said connection. Leading from the bottom of the air cylinder 92 is a pipe 145 which is carried upwardly through the body of the stand and at its upper extremity is thence directed outwardly over the trap connection 107 to parallel the pipe 144, being fitted at its outer end through the guide 114. Leading from the top of the air cylinder 92 is a pipe 146 which is also carried upwardly through the body of the stand and at its upper extremity is directed forwardly above the trap connection to parallel the pipe 144 at the side thereof opposite the pipe 145, being fitted at its outer end through the guide 114. Fitted over the outer end of the pipe 144 is a flexible tube or pipe 147 which, at its outer end is fitted over a nipple 148 threaded into the passage 136 of the operating valve casing 124. At their inner ends the pipes 145 and 146 communicate with longitudinal grooves 149 and 150 respectively, formed in the inner face of the air cylinder 92 to extend in opposite directions from the inner terminals of the pipes toward the ends of the cylinder. Fitted over the outer ends of these pipes 145 and 146 are flexible tubes or pipes 151 and 152 which, at their outer ends, are fitted over nipples 153 and 154 respectively, threaded into the passages 138 and 139 of the valve casing 124. Clamped about the outer end of the discharge hose 115 is a guide 155 upstanding from the said hose to receive the outer extremities of the pipes 147, 151 and 152.

As will now be seen, the handle 132 of the valve plug 129 may be grasped when, by shifting this handle to engage the lug 134 of the handle with the stop flange 127, the valve plug will be rotated to a position establishing communication between the passage 136 and passage 138 of the valve casing through the passage 135 of the valve plug. Air will then be permitted to flow from the source of supply through the pipe 144, the pipe 147 and nipple 148 through the valve, thence through the nipple 153 and pipe 151, and thence through the pipe 145 to enter at the bottom of the air cylinder 92. Since the piston 96 within the cylinder will, as previously explained, normally stand centered with respect to the said cylinder, admission of air at the bottom of the cylinder, will move the piston upwardly to actuate the plug 76 of the four-way valve for filling the measuring vessel 24 and emptying the measuring vessel 25, as previously explained. In this connection it will be observed that movement of the valve plug to establish communication between the passage 136 and 138 will not interrupt communication between the passage 139 of the valve casing and the vent passage 140 thereof. Consequently, the air cylinder 92 will be vented above the piston through the pipe 146, pipe 152, and nipple 154 through the valve. However, as the piston reaches the limit of its upward movement, the inner terminal of the pipe 146 will be covered thereby, leaving the groove 150 at the top of the cylinder to finally vent said cylinder. The outflow of air from the upper end of the cylinder will thus be greatly restricted to accordingly create an air cushion in the cylinder for retarding the throw of the piston at the limit of its upward stroke. In this way rotary movement of the plug 76 of the four-way valve will be gradually stopped and stress and jar upon the said valve and associated parts thus eliminated. By swinging the handle 132 of the operating valve to engage the stop flange 128 of the valve cap, the valve plug 129 will then be rotated to establish communication between the passage 136 of the casing of the said valve and the passage 139. Consequently, as will be seen in view of the preceding description, air will be admitted through the pipe 146 at the upper end of the air cylinder 92 while the lower end of the said cylinder will be vented through the pipe 145 and passages 138 and 140 at the valve. Upon the admission of air above the piston 96, the said piston will be forced downwardly to actuate the plug 76 of the four-way valve for filling the measuring vessel 25 and emptying the measuring vessel 24 in the manner previously described. As the piston 96 reaches the limit of its downward stroke the inner terminal of the pipe 145 will be covered, leaving the groove 149 at the lower end of the said cylinder to finally vent the cylinder. Thus, the outflow of air from the cylinder will be restricted to accordingly create an air cushion below the piston for cushioning the piston at the limit of its downward stroke. It will accordingly be seen that the operating valve may be actuated for selectively emptying either of the measuring vessels and simultaneously filling the other vessel, and since the said valve is located upon the discharge hose of the device, access to the valve, in the operation of filling the tank of a vehicle, as previously explained, may always be easily had.

Operable from the rack bar 97 of the piston 96 is an indicator 156. This indicator is mounted upon the dome 22 between the measuring vessels and, in its general features, may be of any approved character to include a pointer 157 and numbered disks 158 operable for indicating the total gallonage discharged from the device. However, in order that the indicator may be actuated from the rack bar 97, the said indicator should comprise a ratchet mechanism of the character shown in detail in Fig. 11 of the drawings. This ratchet mechanism includes a ratchet disk 159 mounted to rotate upon a shaft 160 carrying the numbered disks and suitably connected with the pointer 157 of the indicator for swinging the said pointer therefrom. Formed on one side of the said ratchet or otherwise secured thereto, is a star wheel 161 and fixed to the shaft 160 to coöperate with this wheel is a spring 162, the outer end of which is bowed to ride upon the periphery of the wheel. This spring will, therefore, hold the ratchet disk against retrograde movement. Embracing the ratchet disk is a yoke 163 upon the sides of which are formed oppositely presented teeth 164 and 165 respectively, spaced apart a distance slightly greater than the major diameter of the disk and adapted to coöperate with the teeth thereof. Swingingly connected to the lower end of the yoke is a rod 166 which projects through the dome 22 of the stand and into the body thereof. At its lower end this rod is swingingly connected to one end of a rock arm 167 the opposite end of which is, as particularly shown in Figs. 9 and 10 of the drawings, slidably connected with the upper end of the rack bar 97 by a pin 168 projecting laterally from the bar to engage within a suitable slot in the adjacent terminal of the said arm. Pivotally supporting the rock arm intermediate of its ends is a bracket 169 screwed or otherwise fastened to the sleeve 110 of the trap 109 to project laterally from the said sleeve. Assuming now that the yoke 163 is in the position shown in Fig. 11 and that the rack bar 97 is shifted upwardly for filling the measuring vessel 24 and emptying the measuring vessel 25, as previously explained, it will be seen that the rock arm 167 will be actuated to pull the yoke downwardly when the tooth 164 thereof will engage an adjacent tooth on the ratchet disk 159 for rotating the said disk and accordingly swinging the pointer 157 of the indicator one notch of the star wheel 161. Centering of the piston 96 within the air cylinder 92, as previously explained, will then retract the yoke when the teeth of the yoke will assume the position with respect to the teeth of the ratchet disk, shown in dotted lines in Fig. 11. Thus, should the operating valve be, by mistake, actuated for again emptying the measuring vessel just discharged or, in the instance taken, the vessel 25, downward movement of the yoke will not serve to again actuate the ratchet disk since the tooth 164 of the said yoke will be moved to a position out of active engagement with the disk. On the other hand, the tooth 165 of the yoke will be engaged with one of the teeth of the disk at the side thereof opposite the tooth 164. Consequently, actuation of the operating valve to shift the rock bar 97 downwardly for emptying the measuring vessel 24 and filling the measuring vessel 25, will act through the rock arm 167 to lift the yoke for rotating the ratchet disk one notch of the star wheel 161. Centering of the piston 96 will then again serve to return the yoke to the position shown in full lines in Fig. 11. Consequently, should the operating valve be, by mistake, operated to again empty the vessel just discharged, or the vessel 24, actuation of the ratchet disk would not occur since the tooth 165 of the yoke would be shifted out of active engagement with the said ratchet. I accordingly provide a ratchet mechanism of such nature that the indicator will be actuated only upon discharge of gasolene from the device while, at the same time, the pointer of the indicator will be swung in a continuous direction by the reverse movement of the actuating yoke of the said mechanism. The capacity of the measuring vessels being known, it will be seen that the quantity of gasolene discharged will be indicated by the position of the pointer 157 based, of course, upon the capacity of one of the vessels as a unit. Any conventional type of resetting mechanism may be included in the indicator for returning the pointer to its normal position.

Fitted around the nipples 46 at the upper ends of the measuring vessels are inwardly projecting brackets 170 between which is mounted the casing of a light globe 171. A suitable electric lamp, as shown in dotted lines at 172, is preferably mounted within this globe and leading from the bottom of the globe through the casing thereof is a conduit 173, which is carried rearwardly over the indicator 156 and is then directed downwardly through the dome 22 of the stand into the body thereof. At the upper end of the top casting 18 of the stand body this conduit is then directed laterally to one side of the body of the stand and thence forwardly therein when the said conduit is directed downwardly through the stand body for receiving suitable circuit wires leading to the lamp 172. Thus, the globe 171 and lamp 172 will provide an attractive illumination for the device.

Having thus described the invention, what is claimed as new is:

1. A device of the character described including a storage tank, a measuring vessel connected therewith, a discharge for the vessel, means for establishing communication between the vessel and the storage tank or between the vessel and the discharge, and means communicating with the vessel for receiving and containing air displaced therefrom and movable to compensate for excess pressure in the vessel.

2. A device of the character described including a storage tank, companion measuring vessels connected therewith, means establishing communication between the vessels, a discharge for the vessels, means for establishing communication between either of the vessels and the storage tank and simultaneously establishing communication between the other of the vessels and the said discharge, and means communicating with said first mentioned means for maintaining a substantially constant and uniform pressure of air in the measuring vessels.

3. A device of the character described including a storage tank, companion measuring vessels connected therewith, means establishing communication between the vessels, a discharge for the vessels, means for establishing communication between either of the vessels and the storage tank and simultaneously establishing communication between the other of the vessels and the said discharge, a casing arranged adjacent the said measuring vessels, a stand pipe in said casing communicating with said first mentioned means, and a sleeve slidable over said stand pipe within the casing for maintaining a substantially constant uniform pressure of air in the measuring vessels.

4. A device of the character described including a storage tank, a measuring vessel connected therewith, a discharge for the measuring vessel, means controlling communication between the storage tank and the measuring vessel and between the said vessel and the said discharge, fluid pressure operated means for actuating the said first mentioned means, and yieldable means normally holding the said first mentioned means closed.

5. A device of the character described including a storage tank, a measuring vessel connected therewith, a discharge for the measuring vessel, means rotatable in opposite directions for controlling communication between the storage tank and the measuring vessel and between the said vessel and the discharge, fluid pressure operated means reciprocable for rotating the said first mentioned means in opposite directions, and yieldable means normally holding said first mentioned means centered in closed position.

6. A device of the character described including a storage tank, a measuring vessel connected therewith, a discharge for the measuring vessel, means shiftable in opposite directions for controlling communication between the storage tank and the measuring vessel and between the said vessel and the discharge, fluid pressure operated means reciprocable for shifting the said first mentioned means in opposite directions, and yieldable means for normally holding said first mentioned means centered in closed position and acting upon the said first mentioned means for centering the said second mentioned means.

7. A device of the character described including a storage tank, a measuring vessel connected therewith, a discharge for the measuring vessel, means shiftable in opposite site directions for controlling communication between the storage tank and the measuring vessel and between the said vessel and the discharge, fluid pressure operated means reciprocable for shifting the said first mentioned means in opposite directions, and means acting upon the said first mentioned means to counterbalance the said second mentioned means.

8. A device of the character described including a storage tank, a measuring vessel connected therewith, a discharge for the measuring vessel, means shiftable in opposite directions for controlling communication between the storage tank and the measuring vessel and between the said vessel and the discharge, fluid pressure operated means reciprocable for shifting the said first mentioned means in opposite directions, and means for retarding the movement of said second mentioned means near the end of its stroke in opposite directions.

9. A device of the character described including a storage tank, a measuring vessel connected therewith, a discharge for the measuring vessel, means rotatable in opposite directions for controlling communication between the storage tank and the measuring vessel and between the said vessel and the discharge, a gear wheel for rotating said first mentioned means, a rack bar coacting with said gear wheel, a fluid pressure operated piston connected with said rack bar for reciprocating the said bar, and a spring connected with said gear wheel for centering the said wheel to close the said first mentioned means.

10. A device of the character described including a storage tank, a measuring vessel connected therewith, a discharge for the measuring vessel, means shiftable in opposite directions for controlling communication between the storage tank and the measuring vessel and between the said vessel and the discharge, a gear wheel for shifting said first mentioned means, a rack bar coacting with said gear wheel, a fluid pressure operated piston connected with said rack bar for reciprocating the said bar, a pulley connected with the said gear wheel, and a weight acting upon the pulley for counterbalancing the rack bar and piston.

11. A device of the character described including a storage tank, a measuring vessel connected therewith, a discharge for the measuring vessel, means shiftable in opposite directions for controlling communication between the storage tank and the measuring vessel and between the said vessel and the discharge, a cylinder, a piston reciprocable in said cylinder and operable by fluid pressure for shifting the said means in opposite directions, and means upon the cylinder adapted to coöperate with the piston for retarding the piston near the end of its stroke in each direction.

12. A device of the character described including a storage tank, a measuring vessel connected therewith, a discharge for the measuring vessel, means shiftable in opposite directions for controlling communication between the storage tank and the measuring vessel and between the said vessel and the discharge, a cylinder, a piston reciprocable in said cylinder and operable by fluid pressure for shifting the said means in opposite directions, primary means for venting the cylinder upon the movement of the piston toward the end of its stroke in opposite directions and adapted to be selectively closed by the piston, and secondary means for slowly venting the cylinder upon the selective closing of said primary means for retarding the piston toward the end of its stroke in opposite directions.

13. A device of the character described including a storage tank, a measuring vessel connected therewith, a discharge for the measuring vessel, means shiftable in opposite directions for controlling communication between the storage tank and the measuring vessel and between the said vessel and the discharge, a cylinder, pipes opening into the said cylinder adjacent opposite ends thereof, the wall of the cylinder upon its inner face being provided with grooves extending toward the ends of the cylinder from said pipes and in communication therewith, and a piston reciprocable in said cylinder and operable by fluid pressure for shifting the said means in opposite directions, the said pipes being adapted to selectively vent the cylinder upon the movement of the piston toward the end of its stroke in opposite directions and the piston being adapted to selectively close said pipes whereby the venting of the cylinder will be retarded through said grooves selectively for cushioning the piston near the end of its stroke in opposite directions.

14. A device of the character described including a stand having a hollow body, a door normally closing the body, a measuring vessel mounted upon the stand, a storage tank connected with the measuring vessel, a discharge for the measuring vessel, means controlling communication between the storage tank and the measuring vessel and between the said vessel and the discharge, and means for actuating said first mentioned means and mounted upon the said door.

15. A device of the character described including a stand having a hollow body, a door normally closing the body, a measuring vessel mounted upon the stand, a storage tank connected with the measuring vessel, a discharge for the measuring vessel, a valve controlling communication between the measuring vessel and the storage tank and between the said vessel and the discharge, a rotatable gear wheel mounted upon the door, a pulley connected with said gear wheel and forming an operative connection between the gear wheel and the valve, fluid pressure operated means engaging with the gear wheel for rotating the said wheel, and a counterbalance connected with the said pulley.

16. A device of the character described including a storage tank, a measuring vessel connected therewith, a discharge for the measuring vessel, means controlling communication between the measuring vessel and the storage tank and between the measuring vessel and the discharge, fluid pressure operated means for actuating said first mentioned means, and manually operable means controlling the supply of fluid to said last mentioned means, said last mentioned means being mounted upon said discharge and thus always conveniently accessible.

17. A device of the character described including a storage tank, a measuring vessel connected therewith, a discharge for the measuring vessel, means controlling communication between the measuring vessel and the storage tank and between the measuring vessel and the discharge, a cylinder, a piston fluid pressure operated reciprocably in said cylinder for actuating the said means, and a valve controlling movement of the said piston in opposite directions, the said valve including a casing having a supply passage, side passages respectively in communication with the ends of the said cylinder, and a vent passage, and a valve plug mounted in the casing and normally closing the supply passage, the valve plug being provided with a transfer passage and with a vent passage and being rotatable for selectively establishing communication between either of the supply passages and one of the side passages through the transfer passage and simultaneously establishing communication between the other of the side passages and the vent passage of the casing through the vent passage of the plug.

18. A device of the character described including a storage tank, a measuring vessel connected therewith, a discharge for the measuring vessel, means controlling communication between the measuring vessel and the storage tank and between the measuring vessel and the discharge, a cylinder, a piston fluid pressure operated reciprocably in said cylinder for actuating the said means, and a valve controlling movement of the said piston in opposite direction, the said valve including a casing having a supply passage, side passages respectively in communication with the ends of the said cylinder, and a vent passage, a valve plug mounted in the casing and normally closing the supply passage, the valve plug being provided with a transfer passage and with a vent passage and being rotatable for selectively establishing communication between either of the supply passages and one of the side passages through the transfer passage and simultaneously establishing communication between the other of the side passages and the vent passage of the casing through the vent passage of the plug, and yieldable means engaging with the plug for normally holding the plug centered in closed position.

19. A device of the character described including a storage tank, a measuring vessel connected therewith, a discharge for the vessel, means for establishing communication between the vessel and the storage tank or between the vessel and said discharge, and gravitating means communicating with the vessel for maintaining a substantially constant pressure therein but movable to compensate for any excess of pressure in the vessel.

20. A device of the character described including a storage tank, a measuring vessel connected therewith, a discharge for the measuring vessel, means shiftable in opposite directions for controlling communication between the storage tank and the measuring vessel and between said vessel and the discharge, fluid pressure operated means reciprocable for shifting said first mentioned means in opposite directions, and means for cushioning said second mentioned means near the end of its stroke in opposite directions.

21. A device of the character described including a storage tank, a measuring vessel connected therewith, a discharge for the measuring vessel, means controlling communication between the storage tank and the measuring vessel and between said vessel and the discharge, fluid pressure operated means reciprocable for actuating said first mentioned means, and yieldable means normally holding said last mentioned means centered.

22. A device of the character described including a storage tank, a measuring vessel connected therewith, a discharge for the measuring vessel, means for controlling communication between the measuring vessel and the storage tank and between the measuring vessel and the discharge, a cylinder, a fluid pressure operated piston reciprocable in said cylinder for actuating said means, and a manually operable valve carried by said discharge and controlling movement of the piston in opposite directions.

In testimony whereof I affix my signature.

JOHN C. McKALLIP. [L. s.]